(12) United States Patent
Edge et al.

(10) Patent No.: US 12,704,220 B2
(45) Date of Patent: Aug. 11, 2026

(54) HANDS-FREE PORTABLE DEVICE POSITIONING APPARATUS

(71) Applicants: Shari Edge, Dodge Center, MN (US); Rex Edge, Dodge Center, MN (US)

(72) Inventors: Shari Edge, Dodge Center, MN (US); Rex Edge, Dodge Center, MN (US)

( * ) Notice: Subject to any disclaimer, the term of this patent is extended or adjusted under 35 U.S.C. 154(b) by 150 days.

(21) Appl. No.: 18/515,799

(22) Filed: Nov. 21, 2023

(65) Prior Publication Data

US 2024/0255100 A1 Aug. 1, 2024

Related U.S. Application Data

(60) Provisional application No. 63/441,340, filed on Jan. 26, 2023.

(51) Int. Cl.
*F16M 13/04* (2006.01)

(52) U.S. Cl.
CPC .................................... *F16M 13/04* (2013.01)

(58) Field of Classification Search
CPC .................................. F16M 13/04; A45F 3/02
See application file for complete search history.

(56) References Cited

U.S. PATENT DOCUMENTS 2,519,352 A * 8/1950 Carroll .................. B64D 17/30 244/151 R
3,009,613 A * 11/1961 Noland .................. A47B 31/06 224/265
4,715,293 A * 12/1987 Cobbs .................... F16M 13/00 224/265
7,780,049 B1 * 8/2010 Baranoski ................. A45F 3/14 248/323
8,267,294 B2 * 9/2012 Yu ............................ A45F 3/10 224/625
8,505,790 B2 * 8/2013 Yu ........................ F16M 11/041 224/625
10,873,657 B1 * 12/2020 Marsh ................ F16M 11/2021
12,102,218 B2 * 10/2024 Goodloe, Sr. ............. A45F 5/00
2012/0068044 A1 * 3/2012 Rivera ............... F16M 11/2021 248/295.11
2015/0305479 A1 * 10/2015 Sanchez .................... A45F 5/00 224/262
2018/0098616 A1 * 4/2018 Iannotta .................... A45F 5/00
2021/0153644 A1 * 5/2021 Pierre ....................... A45F 5/00

* cited by examiner

*Primary Examiner* — Derek J Battisti
(74) *Attorney, Agent, or Firm* — Brooks, Cameron & Huebsch, PLLC

(57) ABSTRACT

Apparatuses and systems for providing a hands-free portable device positioning are described herein. One wearable portable computing device holding apparatus includes a set of straps that include strap portions that are positioned over shoulders of a wearer, back portions that each extend down a back side of the wearer, and a front portion that extends down a front side of the wearer to secure the apparatus to a torso of the wearer. One apparatus includes a plurality of elongate portable computing device moving members each having a direction of elongation there along, wherein a first one of the elongate portable computing device moving members has a first end attached to a first one of the set of straps along the front portion.

10 Claims, 10 Drawing Sheets

HANDS-FREE PORTABLE DEVICE POSITIONING APPARATUS

PRIORITY INFORMATION

This application claims the benefit of U.S. Provisional Application No. 63/441,340, filed on Jan. 26, 2023, the contents of which are incorporated herein by reference.

TECHNICAL FIELD

The present disclosure relates generally to hands-free mobile device apparatuses.

BACKGROUND

Portable computing devices, such as mobile phones are ubiquitous in today's world and are carried in many situations. For example, portable devices can be utilized by technicians walking through a facility during a service visit, hikers walking on uneven trails, and even by users lying down in bed.

These activities create several problems including the weight of the device stressing the user's physiology during prolonged holding of the device, occupying one or both hands of the user, thereby restricting the user's abilities to do tasks, and by preoccupying the concentration of the user in the act of grasping and articulating the device.

Such issues can cause accidents, fatigue of a user's limbs, and/or inability to speedily accomplish tasks due to a user's hands being occupied holding the device.

DETAILED DESCRIPTION

The present disclosure relates generally to portable device holders, systems, and solutions. Specifically, the present disclosure relates to devices and systems for hands-free use of a mobile device while operating that device. Discussed herein are embodiments of the present disclosure that provide novel advantages over the prior art.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1:
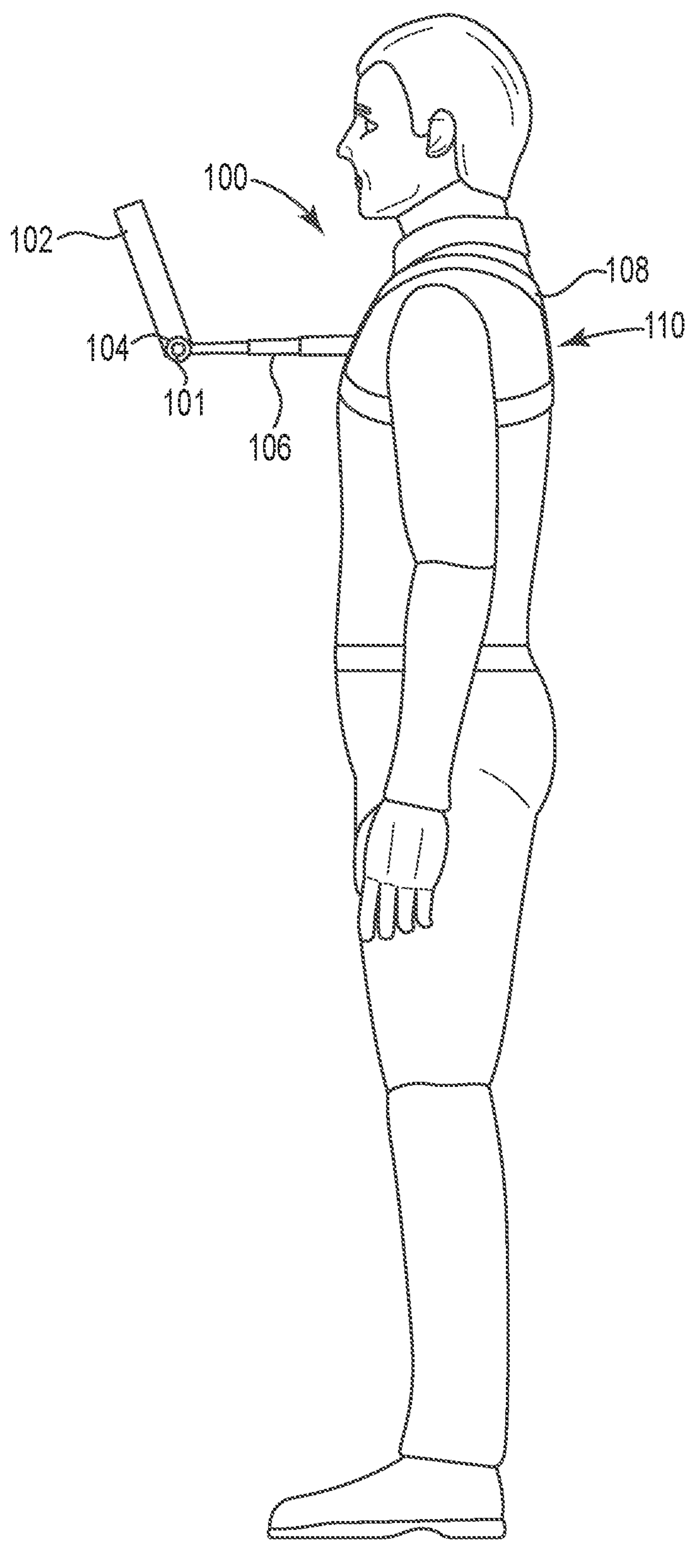
FIG. 1 is an illustration of a side view of a user using an embodiment in accordance with the present disclosure.

FIG. 1 is an illustration of a side view of a user using an embodiment in accordance with the present disclosure. In FIG. 1, the user 100 is in a standing orientation with the portable computing device 102 attached to a wearable portable computing device holding apparatus 110 that includes a securing mechanism 108 for securing of the apparatus 110 to the user 100, a plurality of elongate portable computing device moving members 106 for positioning the portable computing device 102 with respect to the user, and a device articulation mechanism 104 for articulating the portable computing device 102 with respect to the user.

The device articulation mechanism 104 of FIG. 1 is illustrated as a washer and screw mechanism for secure fastening of the portable computing device to the plurality of elongate portable computing device moving members 106. The screw 101 can be loosened or tightened accordingly to articulate the portable device to adjust the angle of the portable computing device 102 with respect to the user 100. The device articulation mechanism 104 is not limited to this particular embodiment. As such, other fastening mechanisms allowing for secure attachment that can adjust the angle of the portable device would be possible.

In the embodiment illustrated in FIG. 1, the securing mechanism 108 is a set of straps that include two strap portions that are positioned over shoulders of a wearer, two back portions that each extend down a back side of the wearer, and a front portion that extends down a front side of the wearer to secure the wearable portable computing device holding apparatus to a torso of the wearer. Preferably, the straps should be oriented such that they do not restrict the movement of the user while providing a secure anchor to the wearable portable computing device holding apparatus such that the movement of the user creates a predictable movement of the portable computing device 102.

This can be accomplished, for example, by making the straps 108 from a stretchy material, such as materials having elastic or spandex in them. Such materials can be tightened around the torso of the user to effectively hug the torso and use friction between a surface of the strap and the surface of the user's torso to hold the wearable portable computing device holding apparatus 110 in position with respect to the user 100.

This can also be accomplished by how the straps are wrapped around the torso of the user. Some strap wrapping arrangements will be discussed in more detail with respect to the embodiment illustrated in FIG. 3. In the embodiment of FIG. 1, a secure strap arrangement is illustrated where the straps 108 attach to a plurality of elongate portable computing device moving members 106 with one strap passing below the user's arms and the other strap passing above the user's arms.

The plurality of elongate portable computing device moving members 106 each have a direction of elongation there along, wherein a first one of the elongate portable computing device moving members has a first end attached to a first one of the set of straps 108 along the front portion and wherein each of the plurality of elongate portable computing device moving members 106 includes a portable computing device holding structure that allows a portable computing device 102 to be held at a distance from the front side of the wearer and wherein the distance can be changed through articulation of the first one of the elongate portable computing device moving members 106.

In some embodiments, the straps can cross along the back of the user thereby creating an arrangement where there are two straps and each strap has one end attached to the plurality of elongate portable computing device moving members 106 then pass under the arm on one side of the torso of the user and pass over the other arm of the torso of the user. Such an arrangement is shown and discussed in more detail in FIG. 3.

Figure 2A:
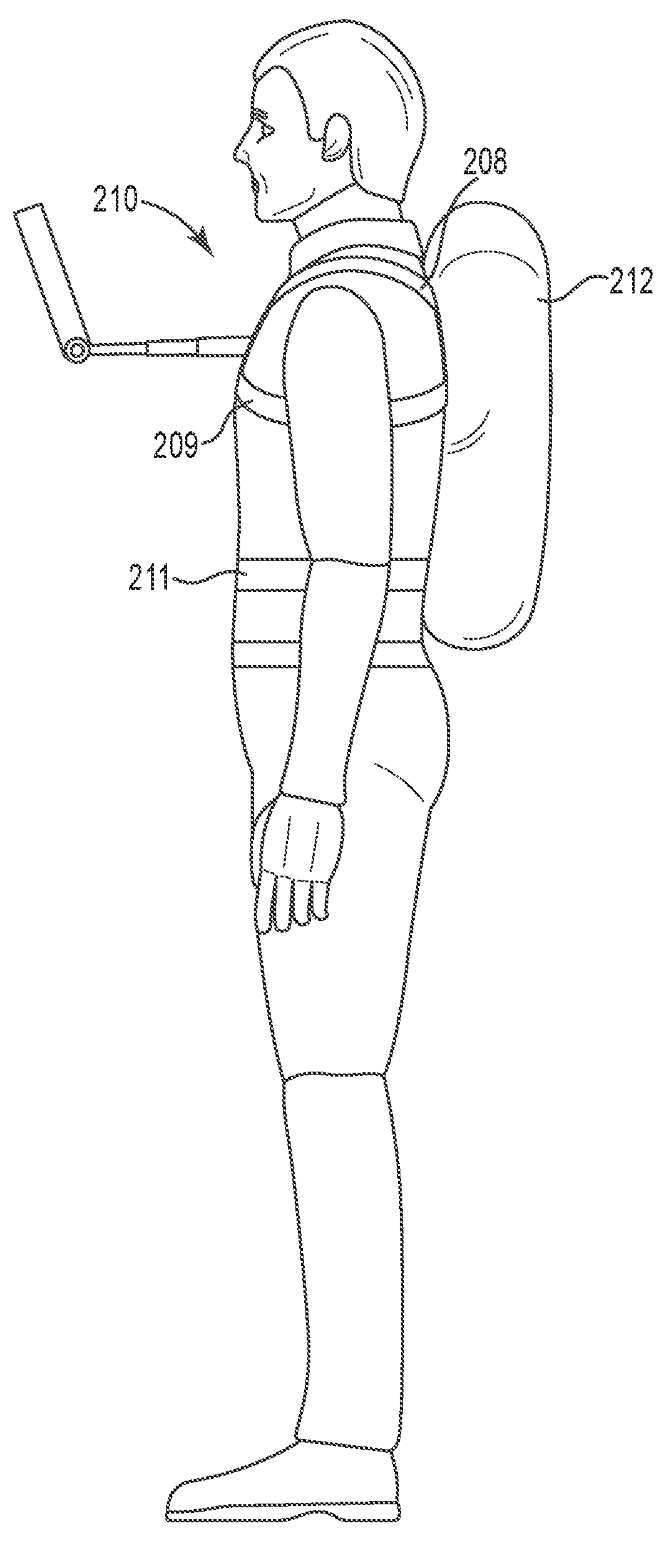
FIG. 2A is an illustration of a side view of a user using another embodiment in accordance with the present disclosure.

FIG. 2A is an illustration of a side view of a user using another embodiment in accordance with the present disclosure. The embodiment of FIG. 2A includes a wearable portable computing device holding system 210 comprising a set of straps 208 that include a strap portion that is positioned over shoulders of a wearer, a back portion that extends down a back side of the wearer, a front portion that extends down a front side of the wearer to secure the wearable portable computing device holding system 210 to a torso of the wearer, and a fastening mechanism along the back portion to releasably attach a backpack 212.

The wearable portable computing device holding system 210 of FIG. 2A includes a plurality of elongate portable computing device moving members each having a direction of elongation there along, wherein each of the elongate portable computing device moving members has a first end attached to the front portion of the set of straps 208 and wherein each of the plurality of elongate portable computing device moving members includes a portable computing device holding structure that allows a portable computing device to be held at a distance from the front side of the wearer and wherein the distance can be changed through articulation of each of the elongate portable computing device moving members.

In such embodiments, the straps can go straight back from the attachment mechanism and attach at their ends to the backpack or can cross along the back of the user and be attached where they cross and/or elsewhere along the straps. The crossed method may provide a more secure attachment to the user and/or to the backpack, in some implementations.

Another way to add a more secure attachment is to add a strap 211 around the waist of the user. This strap will ensure, for example, that the portable computing device moves less up and down as the user is walking. This can be beneficial for hikers and technicians walking a service route.

Such a waist strap could be used without a backpack. For example, two vertical straps could pass over the shoulders of a user and a horizontal strap 209 could encircle the torso of the user around the chest area while another horizontal strap 211 could encircle the torso of the user around the waist. Such straps could include clasp mechanisms that can affix the two ends of the straps together, such as a buckle having a male part attached to one end of the strap and having the female end attached to the other end of the strap.

Any strap discussed herein can be made from multiple parts and can utilize one or more clasp mechanisms to attach the strap parts together. Additionally, straps can include adjustment mechanisms to elongate or shorten the length of a strap to improve the fit of the wearable portable computing device holding apparatus based on the proportions of the user (e.g., waist size, torso length, shoulder breadth, etc.).

Figure 2B:
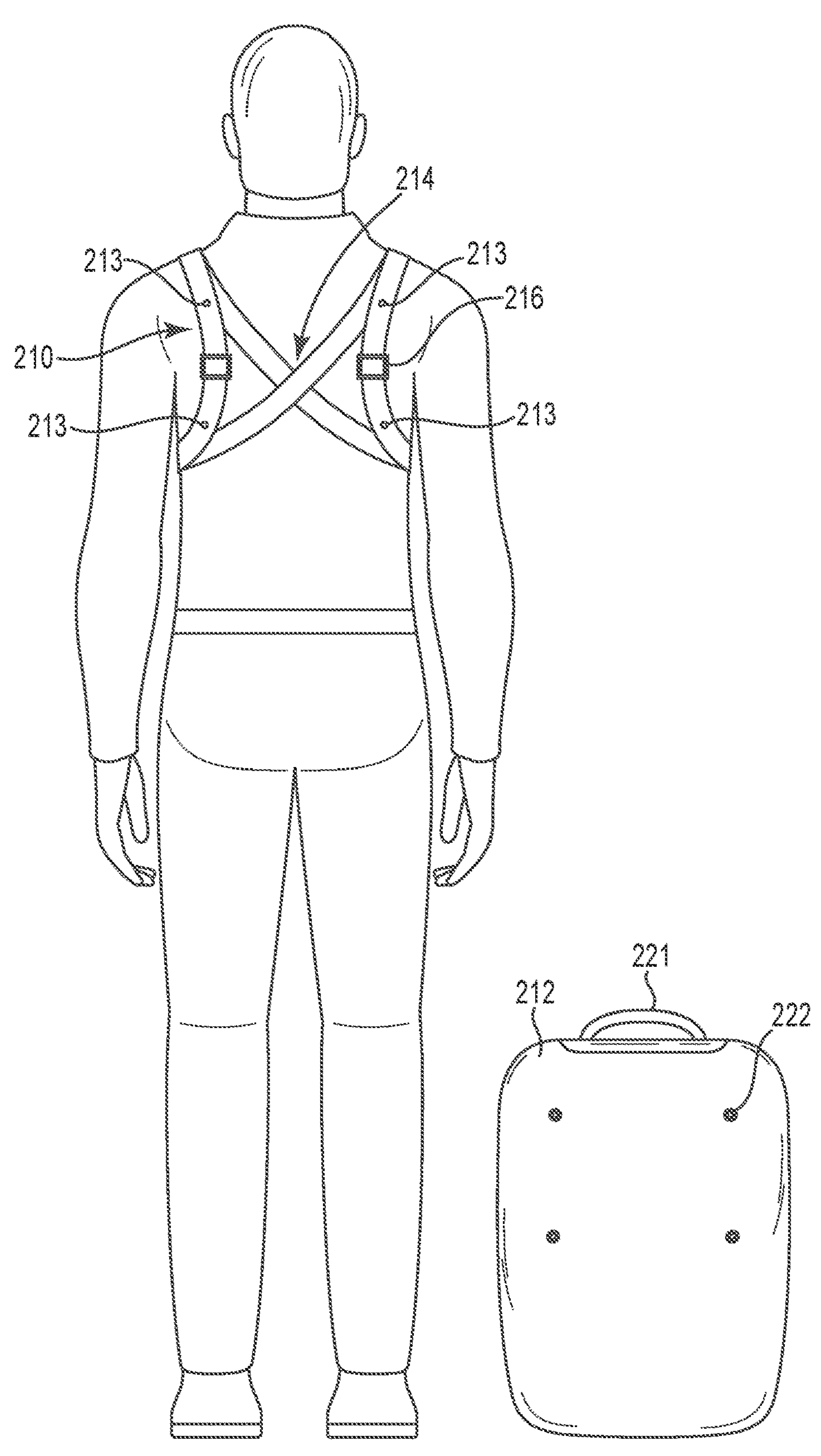
FIG. 2B is an illustration of a back view of a user using another embodiment in accordance with the present disclosure.

FIG. 2B is an illustration of a back view of a user using another embodiment in accordance with the present disclosure. The embodiment of FIG. 2B includes an adjustment mechanism 216 to elongate or shorten the length of a strap to improve the fit of the wearable portable computing device holding apparatus 210 based on the proportions of the user. The straps of the wearable portable computing device holding apparatus 210 can cross along the back of the user to form a crossed method 214 which may provide a more secure attachment to the user in some implementations.

Also illustrated in FIG. 2B are fastening mechanisms 213 positioned along the back portion of the straps of the wearable portable computing device holding apparatus 210. The fastening mechanisms 213 can be spaced accordingly along the straps to secure a backpack 212. The backpack 212 can include fastening mechanisms 222 that correspond to the fastening mechanisms 213 of the straps of the wearable portable computing device holding apparatus 210. The fastening mechanisms 222 (a first snap portion) can be spaced accordingly to line up and attach to the fastening mechanisms 213 (a corresponding second snap portion) in order to provide a secure attachment of the backpack to the wearable portable computing device holding apparatus 210, in some embodiments. Additionally, the backpack 212 can include a handle 221 for ease of transport and carrying, in some embodiments.

Figure 3:
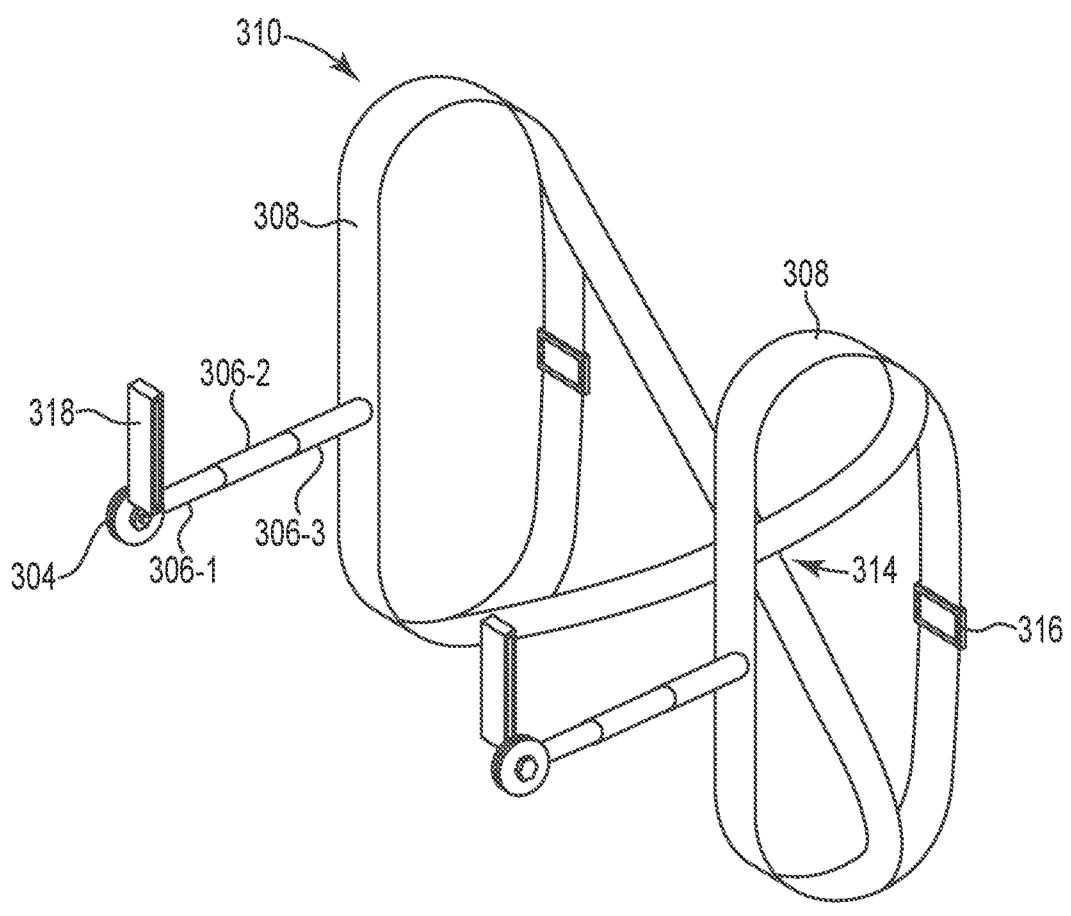
FIG. 3 is an illustration of an angled perspective view of an embodiment in accordance with the present disclosure.

FIG. 3 is an illustration of an angled perspective view of an embodiment in accordance with the present disclosure. In this embodiment, the securing mechanism for the wearable portable computing device holding apparatus 310 is a set of straps 308 that include strap portions that are positioned over shoulders of a wearer, back portions that extend down a back side of the wearer, and front portions that extend down a front side of the wearer to secure the wearable portable computing device holding apparatus 310 to a torso of the wearer.

The wearable portable computing device holding apparatus 310 also comprises a plurality of elongate portable computing device moving members 306 (including sections 306-1, 306-2, 306-3) each having a direction of elongation there along, wherein a first one of the elongate portable computing device moving members has a first end attached to a first one of the set of straps 308 along the front portion and wherein a second one of the elongate portable computing device moving members has a first end attached to a second one of the set of straps along the front portion.

Each of the plurality of elongate portable computing device members 306 has a second end attached to a portable computing device holding structure 318 that allows a portable computing device to be held at a distance from the front side of the wearer and wherein the distance can be changed through articulation of the elongate portable computing device moving members 306. The portable computing device holding structure 318 is attached to the second end of the plurality of elongate portable computing device moving members 306 via a device articulation mechanism 304 that allows each of the plurality of elongate portable computing device moving members 306 to rotate around a central axis of each device articulation mechanism 304.

In this embodiment, the wearable portable computing device holding apparatus 310 includes length adjustment mechanisms 316 that adjust the lengths of the vertical portions of straps 308 and, in some cases, the straps as a whole. The straps 308 are also crossed at 314 which would be positioned along the back of the user. Although indicated on the figure with two number 308's, it should be understood by the reader that a single strap can provide all of the strap portions in an embodiment such as that shown in FIG. 3.

Also illustrated in FIG. 3 is a plurality of elongate portable computing device moving members 306 (having parts 306-1, 306-2, 306-3) for positioning the portable device with respect to the user, and a device articulation mechanism 304 for articulating the portable device with respect to the user. In both FIG. 1 and FIG. 3, the device articulation mechanism 104/304 allows movement of the portable device with respect to the user.

Both device articulation mechanisms 104/304 allow rotation around a central axis passing through the center of the circle shown as the shape of the device articulation mechanisms 104/304. In FIG. 1, that movement is generally perpendicular to the front of the user and in FIG. 3, that movement is generally parallel to the front of the user.

FIG. 3 also includes a portable computing device holding structure 318. The portable computing device holding structure can be any suitable mechanism for attachment of the portable device to the wearable portable computing device holding apparatus 310. Shown in FIG. 3 is a set of straps that can be tightened around the exterior of the portable device (e.g., hook and loop material, straps, fasteners, etc.).

These structures could also be a single item, such as a tray that spans between the device articulation mechanisms 304 having a bottom surface to hold the portable device and a back surface to support the portable device in a vertical configuration. Such an item could be similar to the top portion of a traditional orchestra music stand.

The plurality of elongate portable computing device moving members 306 articulate to change the position of the portable device. This can be done exclusively by the plurality of elongate portable computing device moving members or in addition to the movement by the device articulation mechanisms 304. In the embodiment illustrated in FIG. 3, the plurality of elongate portable computing device moving members has parts 306-1, 306-2, and 306-3. These parts are of different diameters such that they can perform a telescoping functionality. This allows the position of the portable device to be arranged closer or further from the torso of the user. In some embodiments, the user can adjust the position during use, which can be beneficial in many implementations.

Figure 4:
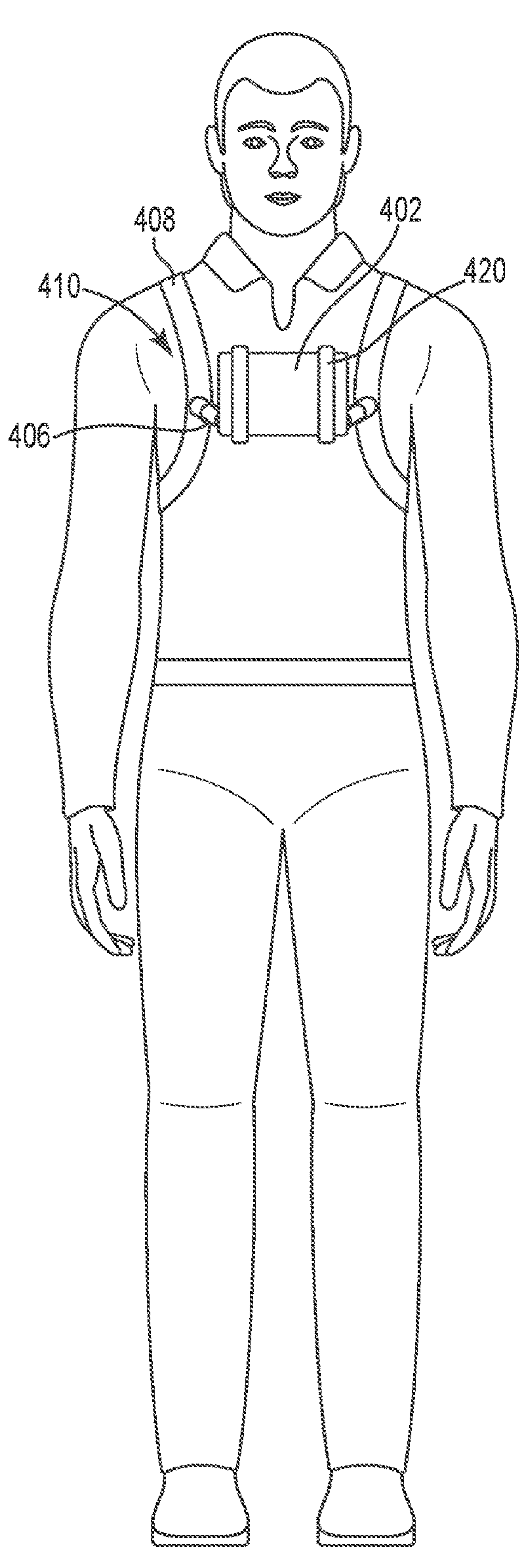
FIG. 4 is an illustration of a front view of a user using another embodiment in accordance with the present disclosure.

FIG. 4 is an illustration of a front view of a user using another embodiment in accordance with the present disclosure. In this embodiment, the wearable portable computing device holding apparatus 410 is worn by a user and includes straps 408 that pass over and under the arms of the user. The portable device 402 is positioned in front of the torso of the user. The portable device 402 is affixed to the straps 408 by the plurality of elongate portable computing device moving members 406 (telescoping) attached to portable device straps 420 that tighten around the portable device 402 to keep it secured to the wearable portable computing device holding apparatus 410. The portable device straps 420 can be of any suitable design as long as they can be adjusted to fit tightly around the portable device. For example, hook and loop material could be used or fabric straps with mechanical clasps that allow for tightening of the portable device straps could be utilized, among other designs.

Figure 5A:
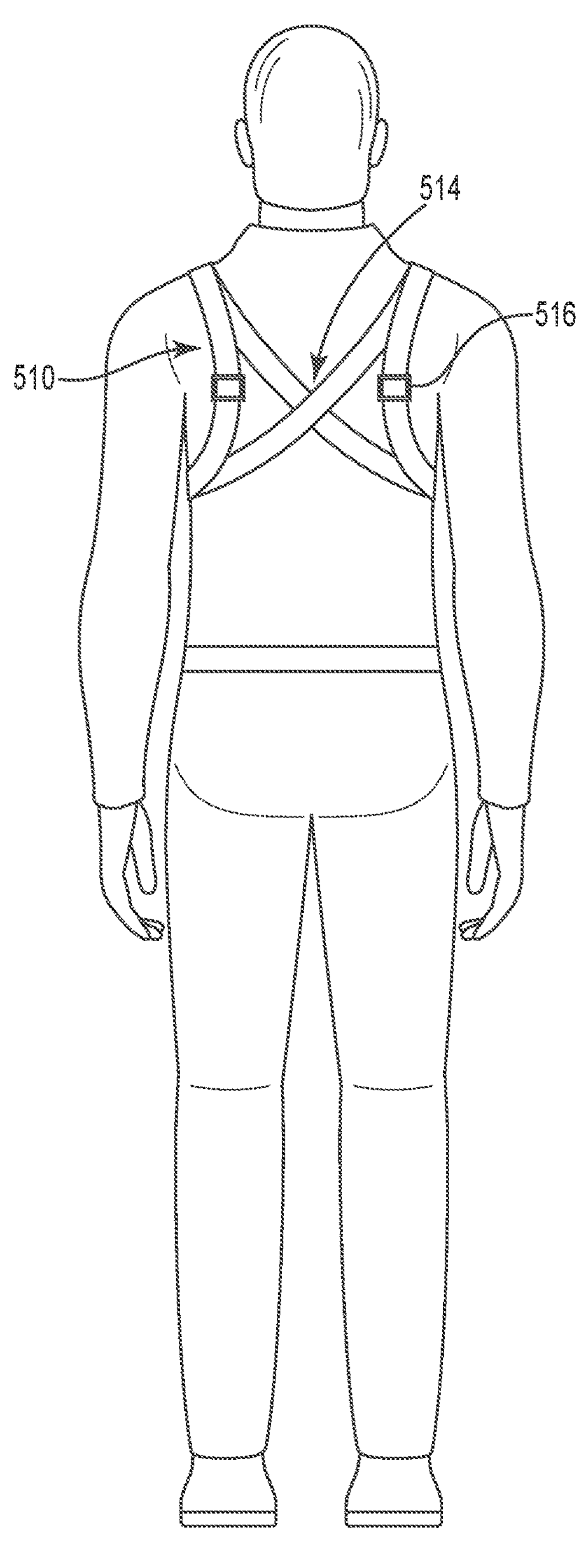
FIG. 5A is an illustration of a back view of a user using another embodiment in accordance with the present disclosure.
Figure 5B:
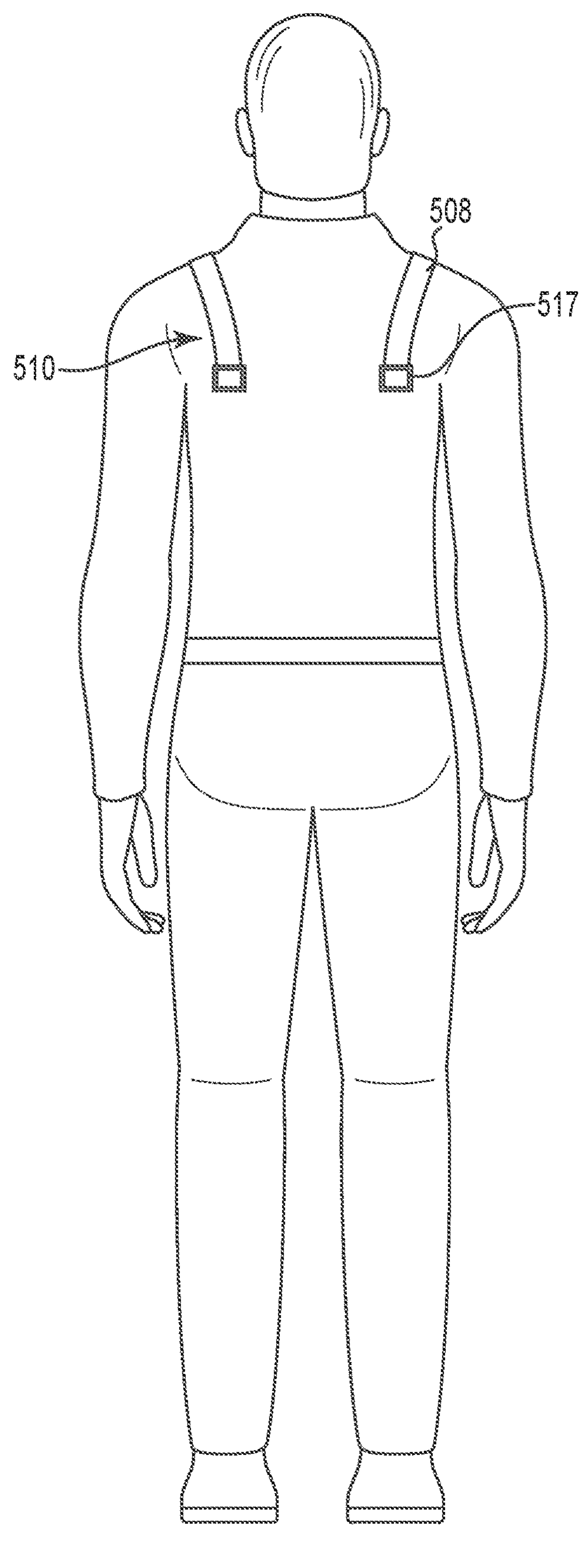
FIG. 5B is an illustration of a back view of a user using another embodiment in accordance with the present disclosure.

FIG. 5A is an illustration of a back view of a user using another embodiment in accordance with the present disclosure. FIG. 5B is an illustration of a back view of a user using another embodiment in accordance with the present disclosure. FIGS. 5A and 5B illustrate implementations for securing the wearable portable computing device holding apparatus 510 to a user.

In FIG. 5A, the straps are flexible and will conform to the user's torso when placed in contact with it and tightened until snug against the user's torso. This can be accomplished via adjustment clasps, such as those shown at 516. Further snugness and anchoring to the user's torso can be provided by straps that cross along the back of the user, such as at 514. As illustrated, these can be additional straps to the vertical straps is this embodiment.

In FIG. 5B, the straps 508 of the wearable portable computing device holding apparatus 510 are made from a rigid, yet moldable material that allows them to be shaped to conform to the torso shape of a particular user, but once shaped, remain configured in that shape so that the apparatus can quickly be positioned on the user having a fit customized for that particular user. The configuration can be changed upon a second user remolding the wearable portable computing device holding apparatus 510 such that the shape can be molded to fit the torso of the second wearer and the wearable portable computing device holding apparatus 510 can retain that configuration after the wearable portable computing device holding apparatus 510 is removed from the second wearer. One suitable material would be a metallic material that can be bent by the user's hands or with household tools (e.g., pliers) making customization convenient for the user. This embodiment optionally includes pads 517 on portions of the straps 508 (e.g., near the ends of the straps 508 along the user's back) so that the strap ends are comfortable against the user's back and don't dig into or chafe the user's body. This design is different from the flexible strap embodiment of FIG. 5A as in that design, once the wearable portable computing device holding apparatus is removed from the torso of the user, the straps do not maintain the shape of the user's torso.

Each implementation has its benefits. For example, the flexible embodiment can be stored in a smaller space and may be more comfortable to wear. The rigid embodiment has a more predictable shape and, likely, provides a steadier positioning of the portable device with respect to the user.

Figure 6A:
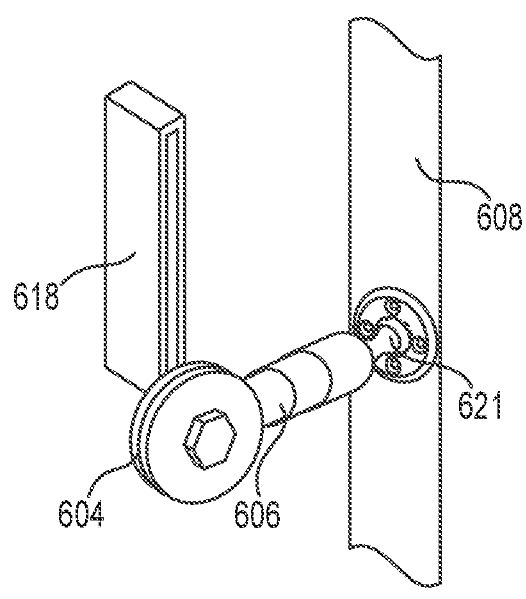
FIG. 6A is an illustration of a portable device attachment mechanism of another embodiment in accordance with the present disclosure.
Figure 6B:
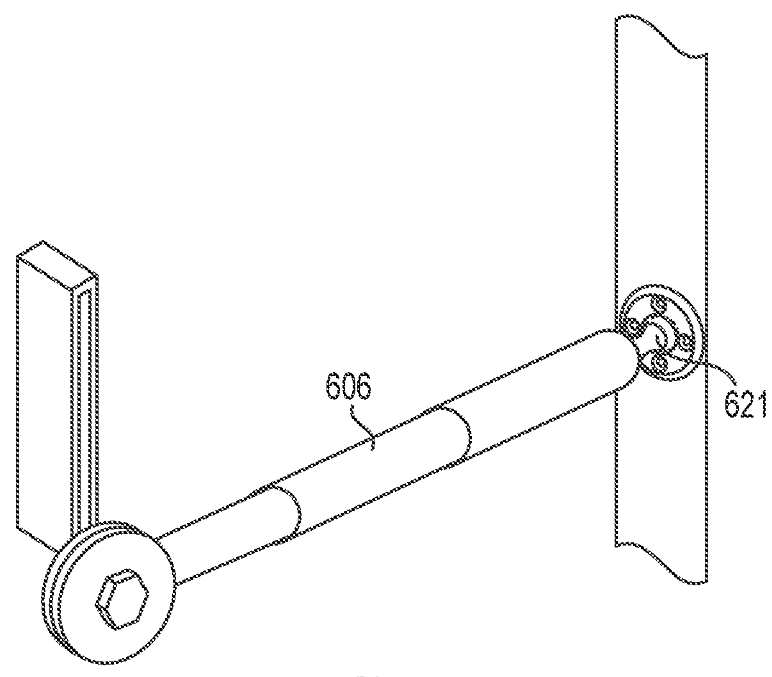
FIG. 6B is an illustration of a portable device attachment mechanism in an extended orientation of another embodiment in accordance with the present disclosure.

FIG. 6A is an illustration of a portable device attachment mechanism of another embodiment in accordance with the present disclosure. FIG. 6B is an illustration of a portable device attachment mechanism in an extended orientation of another embodiment in accordance with the present disclosure. These illustrations show some ways in which the portable device (mounted/affixed to portable computing device holding structure 618) can be moved with respect to the body of the user. For example, the device articulation mechanism 604 can be fixed to the portable computing device holding structure 618 to prevent movement of the portable computing device holding structure 618 with respect to its orientation in relation to the strap 608.

Alternatively, the portable computing device holding structure 618 could be movably connected to the device articulation mechanism 604 allowing the portable computing device holding structure 618 to rotate around a central axis of the device articulation mechanism 604 (e.g., aligned through the center of the hexagonal screw top and projecting along the bottom surface of portable computing device holding structure 618).

The device articulation mechanism 604 is illustrated in FIG. 6A as a washer and screw mechanism, but the connection can also be implemented as a ball and joint connection allowing for three-dimensional movement of the portable computing device holding structure around a central point of the device articulation mechanism 604 in some embodiments. Such an arrangement can also allow for the angle (shown here as perpendicular) between the portable computing device holding structure 618 and the plurality of elongate portable computing device moving members 606 to be changed (e.g., to an obtuse or acute angle) by the user depending on the angle desired by the user.

These figures also illustrate how the plurality of elongate portable computing device moving members 606 can be used to change the position of the portable device relative to the user. In these figures, the parts of the plurality of elongate portable computing device moving members 606 are telescoping and, thereby, the distance between the portable device (mounted/affixed to portable computing device holding structure 618) and the user can be made greater or lessened by manipulation of the plurality of elongate portable computing device moving members 606.

Additionally, the connection between the end of the plurality of elongate portable computing device moving members 606 and the strap 608 can be a movable connection to allow the plurality of elongate portable computing device moving members 606 to move in two-dimensions or three-dimensions with respect to the strap 608. As illustrated in FIG. 6B, a ball joint connection 621 can be utilized to allow for three-dimensional movement around the central point of the ball joint. Alternatively, a swivel connection could be utilized wherein the device articulation mechanism 604 moves parallel (two-dimensionally in an arc) to the direction of elongation of the strap 608. In some embodiments, the connection 621 can be a fixed mechanism allowing no movement between the strap 608 and the elongate portable computing device moving members 606.

Figure 7:
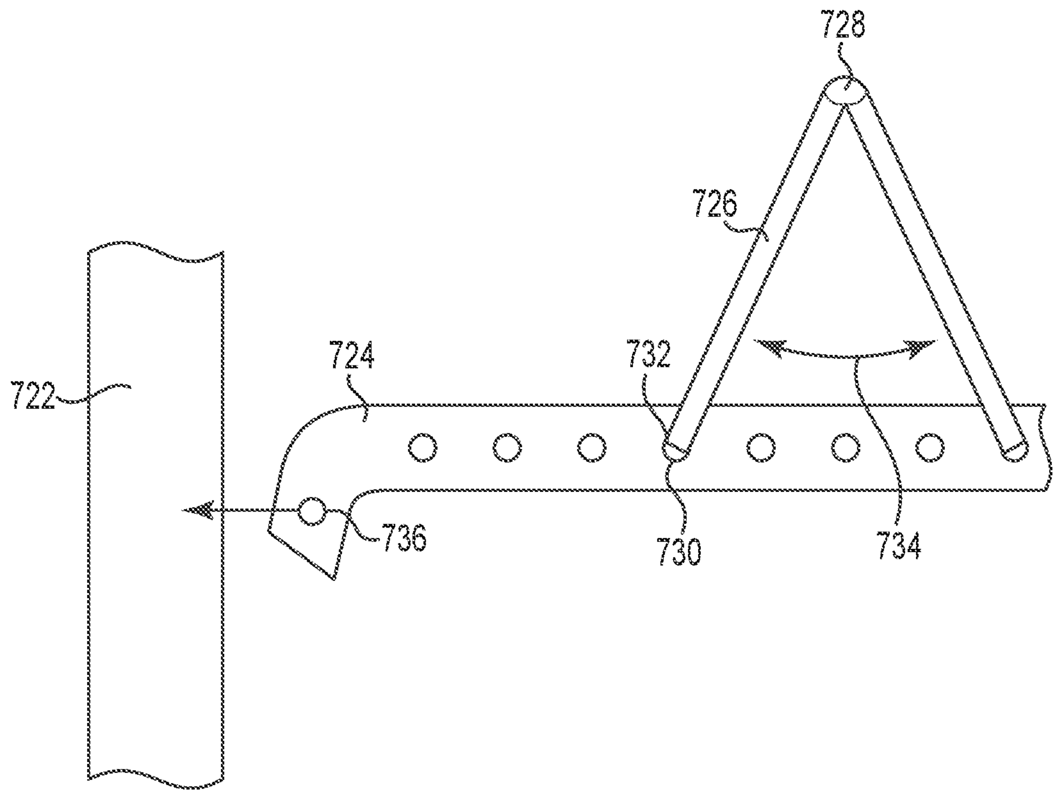
FIG. 7 is an illustration of a side view of a portable device attachment mechanism of another embodiment in accordance with the present disclosure.

FIG. 7 is an illustration of a portable device attachment mechanism of another embodiment in accordance with the present disclosure. The angle of the portable device to the user can also be adjusted by an adjustment mechanism as shown in FIG. 7. Here, an articulating arm 724 has an angled portable device stand 726 mounted thereto.

The angled portable device stand 726 is connected at two ends 732 wherein those ends are inserted into apertures 730 in the articulating arm 724, but could be clamped or otherwise movably attached to the articulating arm 724. In the illustrated embodiment, the articulating arm 724 has a plurality of holes along its length allowing the portable device to be positioned closer or further from the user or for the angle 734 to be changed, thereby changing the angle of the portal device resting on one of the angled surfaces of the angled portable device stand 726. Although stand ends and apertures are used in this embodiment, the reader should understand that any slidable mechanism that can be temporarily fixed in position can be utilized.

The articulating arm 724 can be attached to a strap via a mounting bracket 722 that is attached to the strap. The articulating arm attached to the mounting bracket via a pin placed through aperture 736 and attached to the mounting bracket. The articulating arm can then rotate around the center of aperture 736 thereby allowing positional adjustment of the portable device.

Figure 8A:
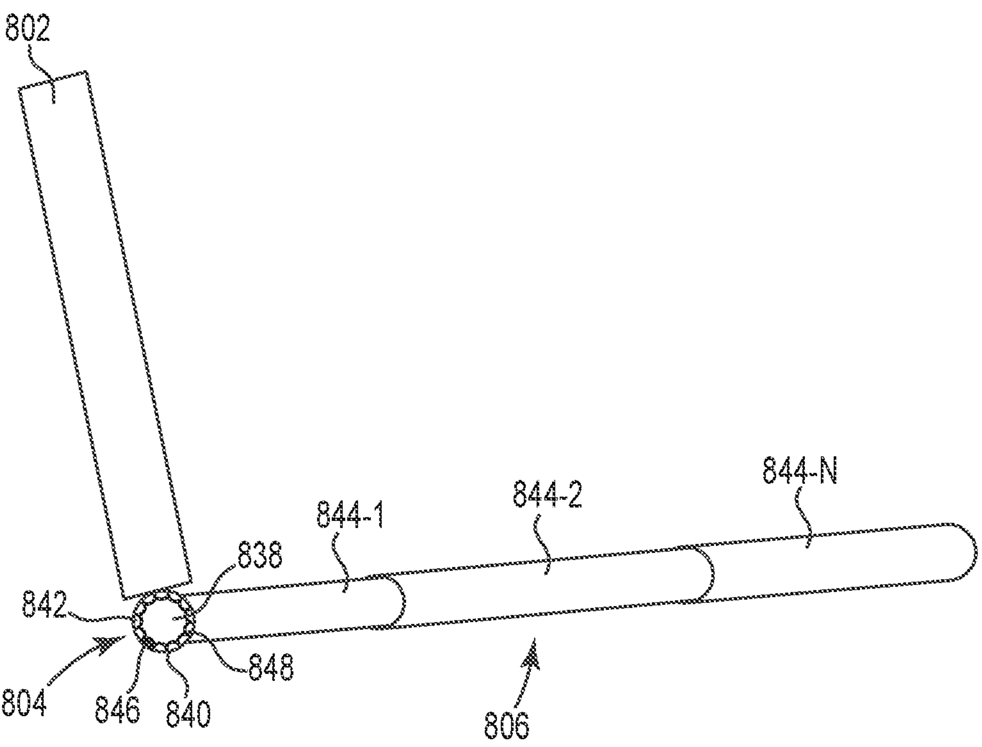
FIG. 8A is an illustration of a side view of a portable device attachment mechanism of another embodiment in accordance with the present disclosure.

FIG. 8A is an illustration of a portable device attachment mechanism of another embodiment in accordance with the present disclosure. In the joints or connections discussed herein, some embodiments can employ a locking mechanism to fix the joint or connection temporarily in place. This may be beneficial in some implementations. For example, a user may want to set a position and always use the same position when using the wearable portable computing device holding apparatus.

Such locking joints and other connections can facilitate that. One example locking mechanism is illustrated in FIG. 8A. In this example, the elongate portable computing device moving member 806 has telescoping parts 844-1, 844-2, and 844-N. These can have a frictional characteristic where, when extended, the end of one part (e.g., 844-1) frictionally restricts lengthening and/or shortening of the two part portion of the elongate portable computing device moving member 806 by movement of the adjacent part (e.g., 844-2). In some such embodiments, the telescope parts can include a twist locking functionality wherein when one part (e.g., 844-1) is twisted relative to an adjacent part (e.g., 844-2) it frictionally locks the two parts in position relative to each other, thereby preventing lengthening or shortening of the two part portion of the elongate portable computing device moving member 806.

The embodiment of FIG. 8A also includes a portable device 802 in a frame that is attached to an device articulation mechanism 804 to the elongate portable computing device moving member 806. The device articulation mechanism 804 is illustrated as a locking assembly in this embodiment having an inner component 838 comprising teeth 848 that locks into an outer ring 840. The teeth 848 are formed on the surface of the inner component 838 such that they form a number of recesses 842 therebetween. The outer ring 840 can have one or more detents 846 within to aid in the locking mechanism of the outer ring 840 with the inner component 838.

The detent 846 is designed to fit within the recesses 842 such that as the frame is rotated, the detent 846 will come to rest in different recesses. Once at rest in a particular recess, the detent will restrict rotational movement of the frame and portable device, thereby locking the portable device in place. Embodiments can have multiple recesses and/or multiple detents. Although a detent-recess mechanism is shown, any suitable locking mechanism can be utilized in any joint described herein.

Figure 8B:
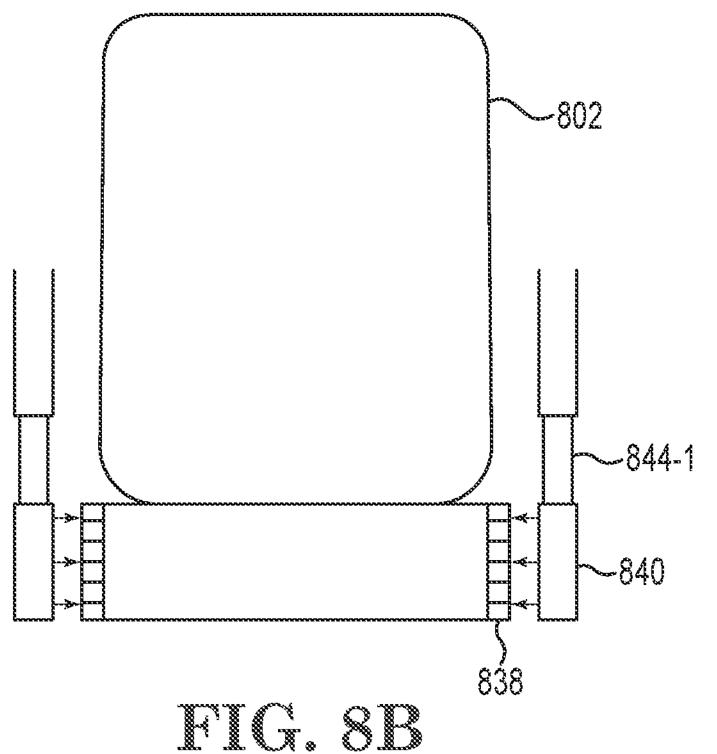
FIG. 8B is an illustration of an exploded front view of a portable device attachment mechanism of another embodiment in accordance with the present disclosure.

FIG. 8B is an illustration of a portable device attachment mechanism of another embodiment in accordance with the present disclosure. The embodiment of FIG. 8B includes a portable device 802 in a frame that is attached to an attachment mechanism to the plurality of elongate portable computing device moving members.

The attachment mechanism is an example of a locking assembly comprising an outer ring 840 that fits around an inner sprocket shaped component 838. The inner sprocket shaped component 838 comprises teeth on the outer surface to engage with the outer ring.

The outer ring 840 is connected to one end of the telescoping part 844-1 of the elongate portable device moving member. The outer ring can include a rubber detent within (not pictured) to interact with the teeth of the inner component to act as a stop mechanism.

The inner sprocket shaped component 838 is connected to a lower portion of the frame of the portable device. To employ the locking mechanism, the outer ring slides around the inner sprocket shaped component. Any rotational movement of the outer ring or inner sprocket shaped component will cause the teeth of the inner sprocket shaped component to interact with the rubber detent within the outer ring and act as a stop mechanism.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A wearable portable computing device holding apparatus, comprising: a set of straps that include two strap portions that are positioned over shoulders of a wearer, two back portions that each extend down a back side of the wearer, and a front portion that extends down a front side of the wearer to secure the wearable portable computing device holding apparatus to a torso of the wearer; a plurality of elongate portable computing device moving members each having a direction of elongation there along, wherein a first one of the elongate portable computing device moving members has a first end directly attached to a first strap of the set of straps along the front portion via a first ball joint connection that allows for three-dimensional movement of the first one of the elongate portable computing device members with respect to the first strap and wherein a second one of the elongate portable computing device moving members has a first end directly attached to a second strap of the set of straps along the front portion via a second ball joint connection that allows for three-dimensional movement of the second one of the elongate portable computing device members with respect to the second strap; wherein each of the plurality of elongate portable computing device moving members includes a portable computing device holding structure attached to a second end of the plurality of elongate portable computing device moving members via a device articulation mechanism that allows a portable computing device to rotate around a central axis of each device articulation mechanism and allows the portable computing device to be held at a distance from the front side of the wearer and wherein the distance can be changed through articulation of the first one of the elongate portable computing device moving members, and wherein each device articulation mechanism includes a locking assembly that allows each of the portable computing device holding structures to be detached from the respective elongate portable computing device moving member; and wherein each of the plurality of elongate portable computing device moving members comprise a plurality of portions of differing diameters to form a telescoping mechanism for elongation along a central axis of the plurality of elongate portable computing device moving members.

2. The wearable portable computing device holding apparatus of claim 1, wherein the set of straps further include a crossed portion extending from the two strap portions positioned over the shoulders of the wearer across the back side of the wearer connecting to a lower portion of the two back portions.

3. The wearable portable computing device holding apparatus of claim 1, wherein the set of straps are moldable such that the set of straps can be configured to the wearer during use and retain their configuration after removal from the wearer.

4. The wearable portable computing device holding apparatus of claim 3, wherein the configuration can be changed to fit a torso shape of a second wearer.

5. The wearable portable computing device holding apparatus of claim 1, wherein the portable computing device holding structures further include attachment mechanisms for removably securing the wearable portable computing device to the wearable portable computing device holding apparatus.

6. A wearable portable computing device holding apparatus, comprising: a set of straps that include a strap portion that is positioned over shoulders of a wearer, a back portion that extends down a back side of the wearer, and a front portion that extends down a front side of the wearer; a plurality of elongate portable computing device moving members each having a direction of elongation there along, wherein a first one of the elongate portable computing device moving members has a first end directly attached to a first strap of the set of straps along the front portion via a first ball joint connection that allows for three-dimensional movement of the first one of the elongate portable computing device members with respect to the first strap and wherein a second one of the elongate portable computing device moving members has a first end directly attached to a second strap of the set of straps along the front portion via a second ball joint connection that allows for three-dimensional movement of the second one of the elongate portable computing device members with respect to the second strap; wherein each of the plurality of elongate portable computing device moving members has a second end attached to a portable computing device holding structure that allows a portable computing device to be held at a distance from the front side of the wearer and wherein the distance can be changed through articulation of the elongate portable computing device moving members; wherein each of the plurality of elongate portable computing device moving members comprise a plurality of portions of differing diameters to form a telescoping mechanism for elongation along a central axis of the plurality of elongate portable computing device moving members; wherein the portable computing device holding structure is attached to the second end of the plurality of elongate portable computing device moving members via a ball and joint mechanism that allows the portable computing device holding structure to rotate three-dimensionally around a central point of the ball and joint mechanism; and wherein the portable computing device holding structure is a set of adjustable straps that allow for tightening around the portable computing device to secure the portable computing device to the wearable portable computing device holding apparatus.

7. The wearable portable computing device holding apparatus of claim 6, wherein the set of straps further include a crossed portion extending from the strap portion positioned over the shoulders of the wearer across the back side of the wearer connecting to a lower portion of the back portion.

8. The wearable portable computing device holding apparatus of claim 6, wherein the set of straps further includes an adjustment mechanism to elongate or shorten the set of straps in a vertical direction along the back side of the wearer.

9. The wearable portable computing device holding apparatus of claim 8, wherein the set of straps are made from a moldable material to conform to the wearer when adjusted.

10. The wearable portable computing device holding apparatus of claim 6, wherein the set of straps are made from a rigid material that conform to the wearer when used and remain configured in that shape once removed from the wearer, and wherein the set of straps further comprise pads attached thereto for added comfort.

* * * * *